UNITED STATES PATENT OFFICE.

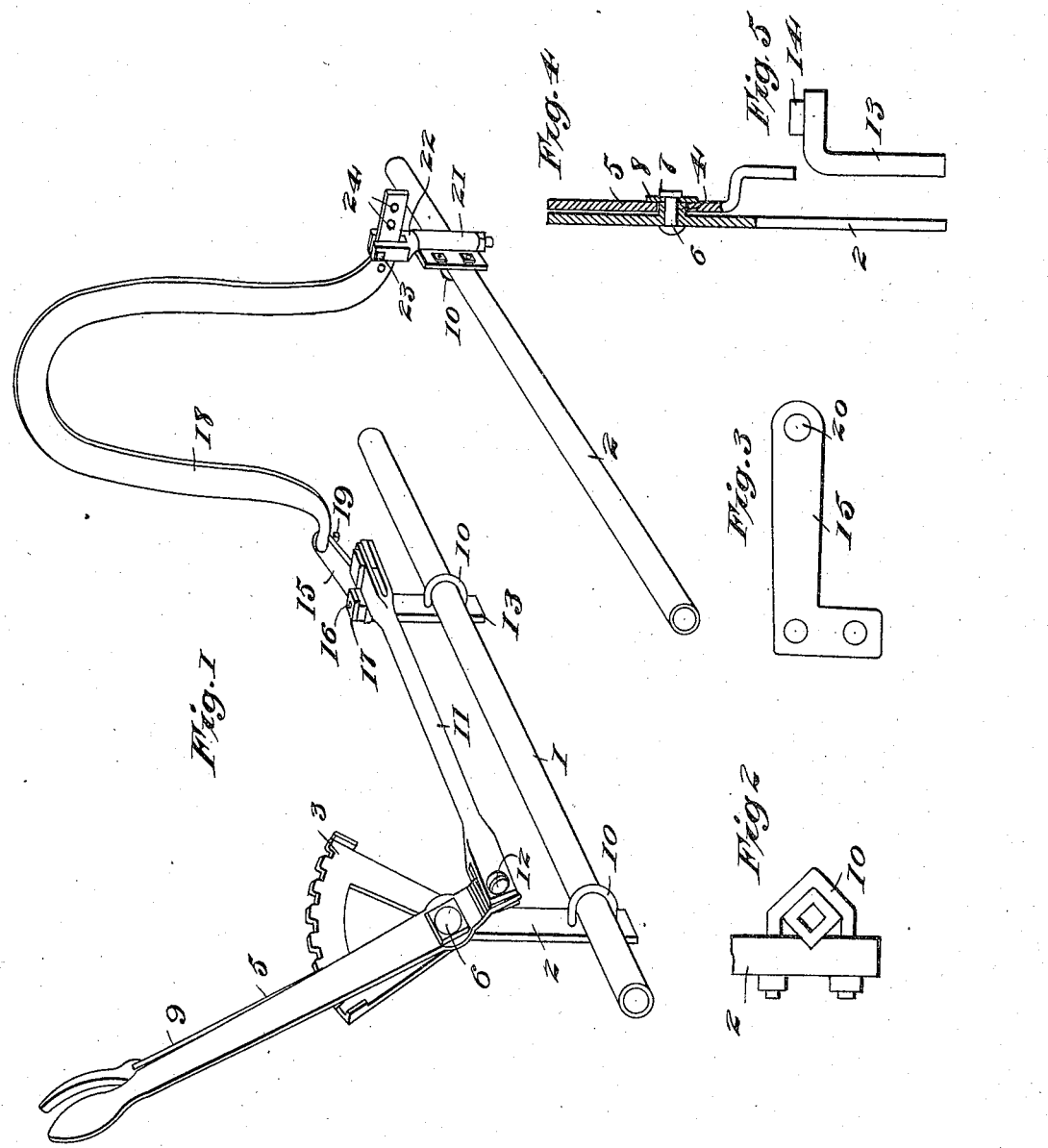

KURT A. FLEISCHHAUER, OF OTTO, TEXAS.

CULTIVATOR-HOBBLE.

1,178,508.  Specification of Letters Patent.  Patented Apr. 11, 1916.

Application filed September 21, 1912. Serial No. 721,568.

*To all whom it may concern:*

Be it known that I, KURT A. FLEISCHHAUER, a citizen of the United States, residing at Otto, in the county of Falls and State of Texas, have invented certain new and useful Improvements in Cultivator-Hobbles, of which the following is a specification.

My invention relates to adjusting devices for cultivator beams, and the object is to provide simple devices for making the positioning of the cultivator beams easily and quickly accomplished and under the immediate control of the operator and to provide an operating lever on which the pull or push is done longitudinally of the direction of the travel and not across or transverse the direction of the moving cultivator and to provide working parts which are pivoted or fulcrumed on studs and not on the pivot bolts.

Other objects and advantages will be fully explained in the following description and the invention will be more particularly pointed out in the claim.

Reference is had to the accompanying drawings which form a part of this application.

Figure 1 is a perspective view of the hobble applied to the beams of a cultivator. Fig. 2 is a detail view, showing the application to a square beam instead of a cylindrical beam. Fig. 3 is a detail view of the hobble controlling lever. Fig. 4 is a detail view, partly in section and broken away, of the main standard and the operating lever, showing the manner of providing a fulcrum for the main operating lever. Fig. 5 is a detail view of the mounting for the hobble controlling lever.

Similar characters of reference are used to indicate the same parts throughout the several views.

Parts of cultivator beams 1 and 2 are shown in the drawings. The operating members are mounted on beam 1 and include a standard 2 which has a rack 3 rigid therewith, and a bearing stud 4 integral therewith which constitutes a fulcrum for the operating lever 5 which is secured thereon by a bolt 6 and a nut 7 and a washer 8. The lever 5 is held in different positions on the rack 3 by a spring actuated dog 9 of the ordinary construction. The standard 2 is attached to the beam 1 by a U-bolt 10. A link bar 11 is pivotally connected to the lever 5 by a bolt 12. Another standard 13 is attached to the beam 1 by a U-bolt 10. This standard 13 has an integral bearing stud 14 which constitutes a fulcrum for the bell crank lever 15 which is pivotally connected to the link bar 11. The lever 15 is held against displacement by a bolt 16 and a nut 17. The hobble 18 has a hook 19 which engages the lever 15 by engaging the perforation 20 in lever 15. The other arm of the hobble 18 is connected to beam 2 by means of a socket 21 which is attached to the beam 2 by a U-bolt 10 and by a bearing stud 22 which is engaged by the socket 21 and the upper end of which is attached to the hobble 18 by a suitable pivot bolt 23, the hobble 18 having a number of perforations 24 for the bolt 23 so that the hobble 18 can be connected at different adjustments to the cultivator beam. The socket 21 will permit the turning of the bearing stud 22 therein.

With the construction described the operator has complete control of the hobble and can adjust the plow beams at will to the plants being cultivated.

The improved devices have the advantage of a direct pull or push on the lever 5 which will make the control of the hobble much easier than the levers which operate transversely to the line of travel of the cultivator.

What I claim, is,—

A hobble for cultivators comprising bearing standards rigidly attached to one beam of a cultivator and having bearing studs integral therewith, an operating lever fulcrumed on one of said studs and a controlling lever fulcrumed on the other stud, a link bar connecting said levers, an arch bar loosely engaging said controlling lever at one end, a bearing socket rigid with the other cultivator beam, and a bearing stud engaging said socket and pivotally connected to the other end of said arch bar.

In testimony whereof, I set my hand in the presence of two witnesses, this 25 day of September 1912.

KURT A. FLEISCHHAUER.

Witnesses:
H. FLEISCHHAUER,
G. W. RENWER.

Copies of this patent may be obtained for five cents each, by addressing the "Commissioner of Patents, Washington, D. C."